US012103826B2

(12) United States Patent
Zeng et al.

(10) Patent No.: US 12,103,826 B2
(45) Date of Patent: Oct. 1, 2024

(54) METHOD AND APPARATUS FOR DETERMINING SAFETY OF OPERATION WHICH CAN BE CARRIED OUT BY CRANE BOOM, AND ENGINEERING MACHINERY

(71) Applicant: ZOOMLION HEAVY INDUSTRY SCIENCE AND TECHNOLOGY CO., LTD., Hunan (CN)

(72) Inventors: Zhongwei Zeng, Hunan (CN); Yibiao Nie, Hunan (CN); Xinyu Fu, Hunan (CN); Qiyang Li, Hunan (CN)

(73) Assignee: ZOOMLION HEAVY INDUSTRY SCIENCE AND TECHNOLOGY CO., LTD., Hunan (CN)

( * ) Notice: Subject to any disclaimer, the term of this patent is extended or adjusted under 35 U.S.C. 154(b) by 373 days.

(21) Appl. No.: 17/621,120

(22) PCT Filed: Jun. 3, 2020

(86) PCT No.: PCT/CN2020/094054

§ 371 (c)(1),
(2) Date: Dec. 20, 2021

(87) PCT Pub. No.: WO2021/237765

PCT Pub. Date: Dec. 2, 2021

(65) Prior Publication Data

US 2022/0348443 A1 Nov. 3, 2022

(30) Foreign Application Priority Data

May 28, 2020 (CN) ......................... 202010468758.3

(51) Int. Cl.
*B66C 23/90* (2006.01)
*B66C 13/18* (2006.01)
*E04G 21/04* (2006.01)

(52) U.S. Cl.
CPC .......... *B66C 13/18* (2013.01); *E04G 21/0463* (2013.01)

(58) Field of Classification Search
CPC ..... B66C 13/18; B66C 23/78; E04G 21/0463; E04G 21/0436; E04G 21/0445;
(Continued)

(56) References Cited

U.S. PATENT DOCUMENTS 6,518,519 B1 * 2/2003 Crane, III ............... E02F 9/264 177/136
8,768,581 B2 * 7/2014 Mizuochi .................. E02F 9/24 701/50
(Continued)

FOREIGN PATENT DOCUMENTS

CN 102514550 A 6/2012
CN 10826469 A 12/2012
(Continued)

OTHER PUBLICATIONS

English Translation of International Search Report from PCT/CN2020/094054 dated Feb. 22, 2021 (2 pages).

*Primary Examiner* — Andrew Joseph Rudy
(74) *Attorney, Agent, or Firm* — Calfee, Halter & Griswold LLP

(57) ABSTRACT

The present invention relates to the field of engineering machinery, and discloses a method and an apparatus for judging the safety of an operation which may be performed by a boom and an engineering machinery, the method including: acquiring parameters for each arm in the boom, wherein the parameters comprise an inclination angle, an arm length, and mass; determining, based on the acquired parameters, a position of the full center of mass of the boom and a position of the combined center of mass from an operating arm to a terminal arm; determining a safety judging basis direction vector based on the position of the
(Continued)

full center of mass and the position of the combined center of mass; and judging the safety of an operation which may be performed on the operating arm based on the safety judging basis direction vector. Therefore, it is realized to judge the safety of the operation which may be performed on the operating arm, and the operating arm has not been operated at the time of judging the safety, so the judgment of the safety of the operation which may be performed on the operating arm is pre-judgment, that is, the safety of the operation which is about to be performed on the operating arm is pre-judged, and the predictability is realized.

9 Claims, 6 Drawing Sheets

(58) Field of Classification Search
CPC ......... E02F 9/2203; E02F 9/2271; E02F 9/26; E02F 9/264; E02F 3/30; E02F 3/308; E02F 3/46; E02F 3/435; E21C 27/30; E21C 47/00; E21C 35/00; G07C 5/02; E21B 7/025
USPC ......... 173/1, 2, 4, 8–11; 175/24, 50; 363/33; 700/218, 228, 273, 275, 278; 701/50
See application file for complete search history.

(56) References Cited

U.S. PATENT DOCUMENTS

| | | | | |
|---|---|---|---|---|
| 9,187,916 | B2 * | 11/2015 | Yi | B66C 23/905 |
| 9,476,256 | B2 * | 10/2016 | Pursimo | E21B 7/025 |
| 10,138,094 | B2 * | 11/2018 | Eberharter | B66C 23/26 |
| 10,655,304 | B2 * | 5/2020 | Lee | E21C 27/30 |
| 11,384,509 | B2 * | 7/2022 | Nakano | E02F 3/437 |
| 11,454,001 | B2 * | 9/2022 | Okada | E02F 9/2203 |
| 2015/0081164 | A1 | 3/2015 | Yi et al. | |
| 2016/0251835 | A1 * | 9/2016 | Kitajima | E02F 3/3663 701/50 |
| 2021/0010281 | A1 * | 1/2021 | Müller | E04G 21/0436 |

FOREIGN PATENT DOCUMENTS

| | | | |
|---|---|---|---|
| CN | 102915045 | A | 2/2013 |
| CN | 110673653 | A | 1/2020 |
| JP | 2007138504 | A | 6/2007 |

* cited by examiner

METHOD AND APPARATUS FOR DETERMINING SAFETY OF OPERATION WHICH CAN BE CARRIED OUT BY CRANE BOOM, AND ENGINEERING MACHINERY

CROSS-REFERENCE TO RELATED APPLICATIONS

This application is a 371 of PCT Application No. PCT/CN2020/094054 filed on Jun. 3, 2020, which claims priority to Chinese Application No. 202010468758.3, filed May 28, 2020, the contents of which are hereby incorporated by reference as if recited in their entirety.

FIELD OF THE INVENTION

The present invention relates to the field of engineering machinery, in particular to a method and an apparatus for judging the safety of an operation which may be performed by a boom and engineering machinery.

BACKGROUND OF THE INVENTION

As for the mobile movable arm mechanical equipment without bearing an external load, the movable arm thereof is a function executing component, and this kind of equipment includes the boom concrete pump truck, the concrete distributor, the (high altitude) operation platform machinery with a folding arm, the folding arm fire-fighting equipment, the mobile cleaning manipulator equipment, the mobile folding arm lifting equipment, the wall building machine and other construction equipment (the external load of the equipment is limited and light, that is, it can be quantified and limited to a non-dominant interference factor). The posture change of the movable arm makes the operation area adapt to the construction requirements. However, the working area cannot be expanded infinitely, on one hand, it is limited by the structure of arm length, and on the other hand, it is limited by the safety of equipment tilting due to tilting torque increasing caused by the long extension of the movable arm, so the working area is limited.

When the boom is unfolded, the equipment is in a critical tilting state. At this time, it is necessary to carry out the operation of avoiding further tilting very accurately. However, there is no such technology to foresee the safety of an operation performed by the boom at present, and the operator may carry out the operation opposite to the operation of avoiding tilting because of misjudgment, which will eventually lead to accidents.

SUMMARY OF THE INVENTION

The objective of the present invention is to provide a method and an apparatus for judging the safety of an operation which may be performed by a boom and engineering machinery, which solve or at least partly solve the above-mentioned problem.

In order to achieve the above objective, an aspect of the present invention provides a method for judging the safety of an operation which may be performed on a boom, the method including: acquiring parameters for each arm in the boom, wherein the parameters include an inclination angle, an arm length, and mass; determining, based on the acquired parameters, a position of the full center of mass of the boom and a position of the combined center of mass from an operating arm to a terminal arm; determining a safety judging basis direction vector based on the position of the full center of mass and the position of the combined center of mass; and judging the safety of an operation which may be performed on the operating arm based on the safety judging basis direction vector.

Preferably, the safety judging basis direction vector includes a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass.

Preferably, the judging the safety of an operation which may be performed on an operating arm based on the safety judging basis direction vector includes: judging that the operation of unfolding the operating arm increases safety and the operation of folding the operating arm increases risk under the condition that the direction of the first direction vector is consistent with the direction of the second direction vector and the direction of the third direction vector is vertically upward; judging that the operation of unfolding the operating arm increases risk and the operation of folding the operating arm increases safety under the condition that the direction of the first direction vector is consistent with the direction of the second direction vector and the direction of the third direction vector is not vertically upward; judging that the operation of unfolding the operating arm increases safety and the operation of folding the operating arm increases risk under the condition that the direction of the first direction vector is inconsistent with the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

Preferably, before judging the safety of an operation which may be performed on the operating arm, the method further includes: judging whether any operation which may be performed on any arm of the boom is safe and risk-free; and not judging the safety of an operation which may be performed on the operating arm and allowing an unfolding or folding operation on the operating arm in the case that any operation which may be performed on any arm of the boom is safe and risk-free.

Preferably, the method further includes presenting the safety of an operation which may be performed on the operating arm in at least one of the following ways: a display screen interface, an indicator light, sound, a symbol and vibration.

Correspondingly, another aspect of the present invention provides an apparatus for judging the safety of an operation which may be performed on a boom of engineering machinery, the apparatus including: a parameter acquisition module configured to acquire parameters for each arm in the boom, wherein the parameters include an inclination angle, an arm length, and mass; a center of mass position determination module configured to determine, based on the acquired parameters, a position of the full center of mass of the boom and a position of the combined center of mass from an operating arm to a terminal arm; a direction vector determination module configured to determine a safety judging basis direction vector based on the position of the full center of mass and the position of the combined center of mass; and a safety judging module configured to judge the safety of an operation which may be performed on the operating arm based on the safety judging basis direction vector.

Preferably, the safety judging basis direction vector includes a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass.

Preferably, the safety judging module judges the safety of an operation which may be performed on an operating arm based on the safety judging basis direction vector includes: judging that the operation of unfolding the operating arm increases safety and the operation of folding the operating arm increases risk under the condition that the direction of the first direction vector is consistent with the direction of the second direction vector and the direction of the third direction vector is vertically upward; judging that the operation of unfolding the operating arm increases risk and the operation of folding the operating arm increases safety under the condition that the direction of the first direction vector is consistent with the direction of the second direction vector and the direction of the third direction vector is not vertically upward; judging that the operation of unfolding the operating arm increases safety and the operation of folding the operating arm increases risk under the condition that the direction of the first direction vector is inconsistent with the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

Preferably, before judging the safety of an operation which may be performed on the operating arm, the safety judging module is further configured to: judging whether any operation which may be performed on any arm of the boom is safe and risk-free; and not judging the safety of an operation which may be performed on the operating arm and allowing an unfolding or folding operation on the operating arm in the case that any operation which may be performed on any arm of the boom is safe and risk-free.

Preferably, the apparatus further including a presentation module configured to present the safety of an operation which may be performed on the operating arm in at least one of the following ways: a display screen interface, an indicator light, sound, a symbol and vibration.

Besides, another aspect of the present invention also provides engineering machinery including the apparatus as described above.

In addition, another aspect of the invention also provides a machine-readable storage medium which stores instructions for causing a machine to perform the method described above.

With the above technical solution, based on the parameters of each arm in the boom, it is realized to judge the safety of an operation which may be performed on the operating arm, and the operating arm has not been operated at the time of judging the safety, so the judgment of the safety of the operation which may be performed on the operating arm is pre judgment, that is, the safety of the operation which is about to be performed on the operating arm is pre-judged, and the predictability is realized. In addition, the safety of the operation which may be performed on the operating arm can be predicted based on the judgment result, and the operator can perform the operation for increasing the safety on the operating arm based on the judgment result, thus avoiding the problem that the operator may carry out the operation opposite to the operation of avoiding tilting because of misjudgment, which will eventually lead to accidents.

Other features and advantages of the present invention will be described in detail in the detailed description of the embodiments.

BRIEF DESCRIPTION OF DRAWINGS

The accompanying drawings are included to provide a further understanding of the invention and constitute a part of this specification and, together with the following detailed description of the embodiments, serve to explain the invention, but do not constitute a limitation to the invention. In the drawings.

DESCRIPTION FOR REFERENCE NUMBERS IN THE ACCOMPANYING DRAWINGS

Figure 1:
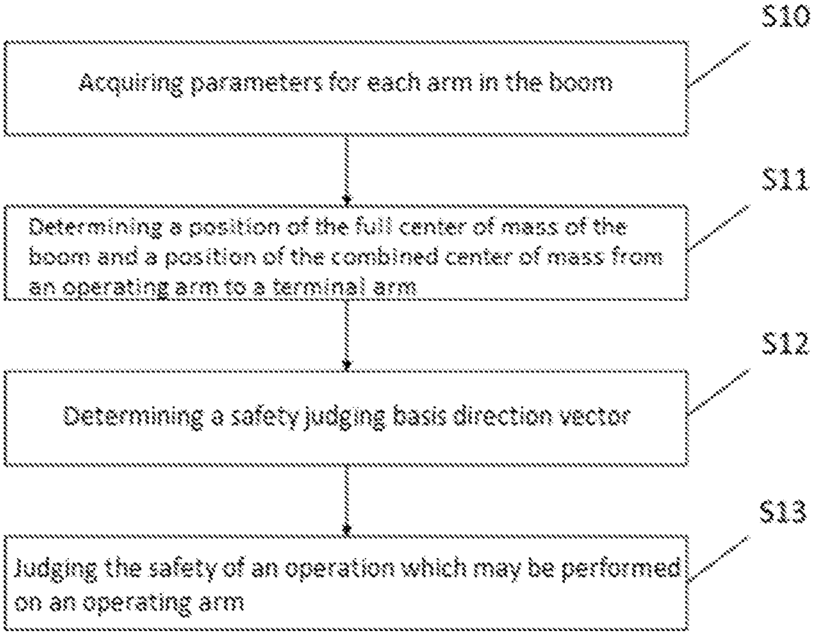
FIG. 1 is a flow chart illustrating a method for judging the safety of an operation which may be performed on a boom of engineering machinery provided by an embodiment of the present invention.

1 parameter acquisition module
2 center of mass position determination module
3 direction vector determination module
4 safety judging module

DETAILED DESCRIPTION OF THE EMBODIMENTS

Detailed description of specific embodiments of the invention is set forth below in conjunction with the accompanying drawings. It should be understood that the specific embodiments described herein are intended to illustrate and explain the invention only, and are not intended to limit the invention.

In the prior art, the following two technical solutions for evaluating equipment tilting safety are disclosed. The first is to detect the support plane area and the center of gravity of the whole vehicle, evaluate the safety against tilting according to whether or not the center of gravity of the whole vehicle falls within the support area and the proximity of the center of gravity to the boundary and implement a corresponding control; and the second is the combined use of leg force detection to evaluate the safety of the equipment against tilting, and achieve the effect on the safety factor of the actions of the arms in combination with boom posture detection, thereby constraining the boom actions.

The first technical solution only focuses on the influence of the center of gravity of the whole vehicle of equipment on tilting, and controls the movement of the boom with the partition (as a criterion) that meets certain rules in the support area (the center of gravity of the whole vehicle falls) to ensure the safety of anti-tilting. This is an "effect evaluation", that is, only after the equipment operator implements an operation can he know afterwards whether the operation has a favorable or unfavorable impact on the movement of the center of gravity of the whole vehicle. Moreover, unless it is an experienced operator, he may not be able to correctly judge how to operate the equipment (boom) to make sure that the action of the boom is conducive to the stability of the whole vehicle (anti-tilting).

In the second technical solution, it is expected that the movement direction can judge the safety trend by boom posture detection, but the safety factor is directly related to the center of gravity of the whole vehicle and needs to be returned to be calculated by reaction force, so as to judge the safety of anti-tilting. That is to say, the two technologies must be combined in order to produce sufficient criteria and realize the control intervention of boom action safety.

Therefore, the first technical solution does not involve the movement (action) safety control of each boom, but only the overall control of the whole vehicle; this control has hysteresis; and the second technical solution involves the control of each boom, but the "logic chain" of the criterion is too long. Although it is a more preferred and fully guaranteed implementation technology in the eyes of the inventor of the comparison technology, the high implementation cost and many links also bring reliability problems. To sum up, the effect evaluation of the first technical solution and the second technical solution is responsive judgment without predictability. The limitation of the first technical solution and the second technical solution on the boom movement is to judge the operation effect through the overall safety, and the operator does not get the guidance of "cautious" operation after the boom stops moving. "Cautious" and blind operation may still aggravate the tilting danger, and the equipment may be in tilting danger for a long time and cannot be released. As an integral anti-tilting technology, the second technical solution includes the judgment idea of controlling each boom separately, but the problem is that the method provided by it can only be applied to most boom postures, and does not have universal accuracy.

The technical solution provided by the present invention provides a pre-judgment method of boom operational safety, which may provide better basis for safe control of equipment against tilting. The common "unpredictable" problem of the two solutions described above will also be solved in the present solution.

One aspect of embodiments of the present invention is to provide a method for judging the safety of an operation which may be performed on a boom of engineering machinery.

FIG. 1 is a flow chart illustrating a method for judging the safety of an operation which may be performed on a boom of engineering machinery provided by an embodiment of the present invention. As shown in FIG. 1, the method includes the following.

In step S10, parameters are acquired for each arm in the boom, wherein the parameters include an inclination angle, an arm length and mass, i.e. for each arm, the parameters include the inclination angle, arm length and mass of the arm. The inclination angle can be obtained in a variety of ways, for example, directly by an inclination sensor, or indirectly by other means of detection, such as detecting the angle between the booms by an encoder, or convert out the angle between the booms by detecting of the boom cylinder travel.

In step S11, based on the acquired parameters, a position of the full center of mass of the boom and a position of the combined center of mass from an operating arm to a terminal arm are determined.

Figure 2:
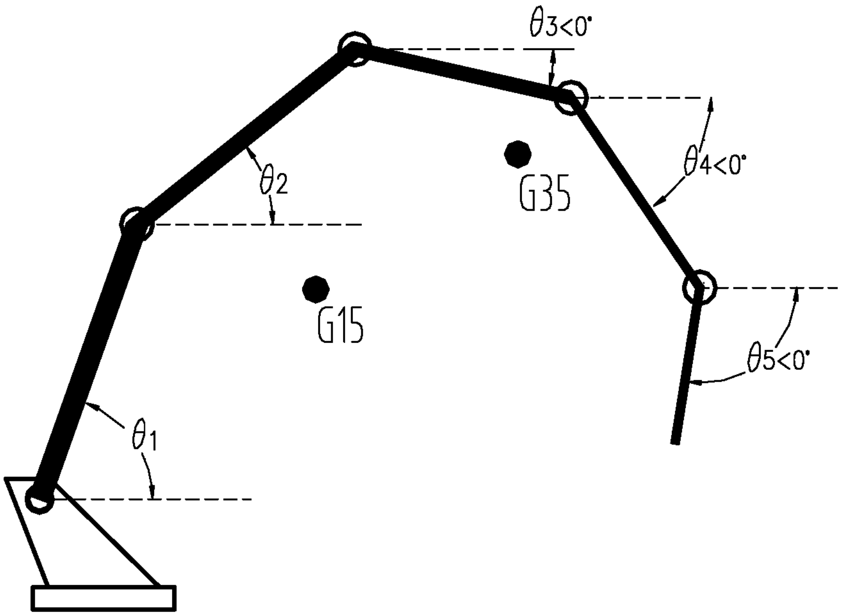
FIG. 2 is a schematic diagram illustrating calculation of the center of mass provided by another embodiment of the present invention.

Taking 5 arms as an example, how to calculate the position of the full center of mass and the position of the combined center of mass is illustrated below in conjunction with FIG. 2. In FIG. 2, $\theta_1$, $\theta_2$, $\theta_3$, $\theta_4$, $\theta_5$ represent the boom inclination angles. Further, the terminal arm is n arm, and any arm of interest is k arm.

As shown in FIG. 2, with the beginning end of 1 arm as the origin, the horizontal unfolding direction of the boom is an x positive direction, and the vertical direction is a y positive direction:

First, coordinates ($x_i$, $y_i$) of the terminal end of each arm are calculated:

$$\begin{cases} x_i = \sum_{j=1}^{i} L_j * \cos\theta_j \\ y_i = \sum_{j=1}^{i} L_j * \sin\theta_j \end{cases} \quad i = 1 \ldots n$$

Second, coordinates ($x'_i$, $y'_i$) of the center of mass of each arm are calculated:

$$\begin{cases} x'_i = x_{i-1} + L'_i * \cos\theta_i \\ y'_i = yx_{i-1} + L'_i * \sin\theta_i \end{cases} \quad i = 1 \ldots n$$

Finally, coordinates ($x_{kn}$, $y_{kn}$) of the global center of mass from the k arm to the terminal arm are calculated:

$$\begin{cases} x_{kn} = \dfrac{\sum_{j=k}^{n} x'_j * m_j}{\sum_{j=k}^{n} m_j} \\ y_{kn} = \dfrac{\sum_{j=k}^{n} y'_j * m_j}{\sum_{j=k}^{n} m_j} \end{cases} \quad i = 1 \ldots n$$

Wherein, n represents the number of an arm; $L_j$ represents the arm length of the 1 arm; $L'_i$ represents the length of the i arm; $\theta_j$ represents the inclination angle of the j arm; $\theta_i$ represents the inclination angle of the i arm; $m_j$ represents the mass of the j arm; the coordinates ($x_{kn}$, $y_{kn}$) are the coordinates of the global center of mass from the k arm to the n arm in the coordinate system; if the k arm is the operating arm, $G_{kn}$ represents the position of the combined center of mass from the operating arm to the terminal arm; if the k arm is the 1 arm, then $G_{1n}$ means that the coordinates of the center of mass of the full boom are G1n, that is, the position of the full center of mass. The approximate positions of G35 and G15 are given in FIG. 2.

In step S12, based on the position of the full center of mass and the position of the combined center of mass, a safety judging basis direction vector is determined. According to the safety judging basis direction vector, the safety of an operation which may be performed on the operating arm can be judged, specifically, the safety is judged in accordance with the direction of the direction vector.

Preferably, in an embodiment of the invention, the safety judging basis direction vector includes a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass.

By taking FIG. 3 as an example, the safety judging basis direction vector in the embodiment of the present invention will be described in an exemplary manner. The position of the full center of mass and the position of the combined center of mass are obtained with reference to the relevant introduction in FIG. 2. In addition, it should be noted that the terminal end of the N arm is the terminal end of the full boom, the beginning end of the 1 arm is the beginning end of the full boom, the terminal end of arm of the small serial number is the beginning end of the arm of a larger serial number, and the k arm is the operating arm.

Figure 3:
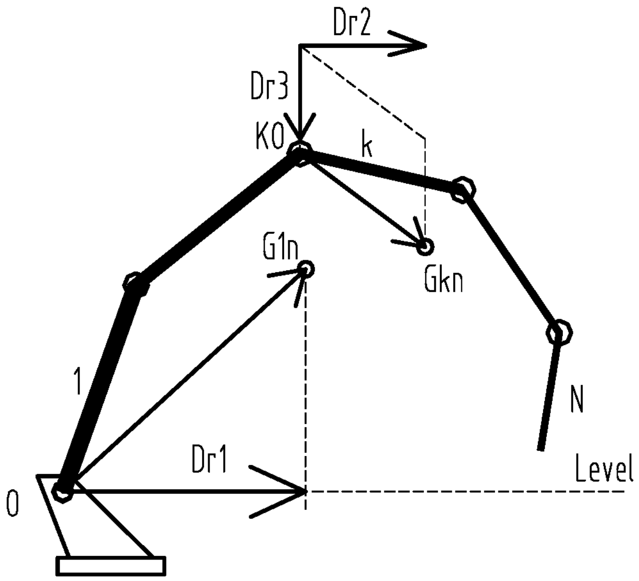
FIG. 3 is a schematic diagram illustrating a safety judging basis direction vector provided by another embodiment of the present invention.

As shown in FIG. 3, $G_{1n}$ represents the boom center of mass from the 1 arm to the n arm, i.e. the position of the full center of mass; $G_{kn}$ is the boom center of mass from the k arm to the n arm, i.e. the position of the combined center of mass; K0 is the beginning end (i.e., the end near the O point) point of the k arm, the k arm is the operating arm, and the O point is the beginning end of the boom. The vector $OG_{1n}$ represents the direction vector from the beginning end of the boom (the beginning end of the boom is 0, i.e. the beginning end of the 1 arm) to the position of the full center of mass ($G_{1n}$), Dr1 is the first direction vector, and Dr1 is the projection vector in the horizontal direction of the $OG_{1n}$ vector. The vector $K0G_{kn}$ represents the direction vector from the beginning end (K0) of the operating arm (the k arm) to the position of the combined center of mass Gkn; Dr2 is the second direction vector, Dr2 is the projection vector in the horizontal direction of the $K0G_{kn}$ vector; Dr3 is the third direction vector, and Dr3 is the projection vector in the vertical direction of the $K0G_{kn}$ vector. The $K0G_{kn}$ vector is decomposed after translation for clarity of presentation in FIG. 3. In addition, the first direction vector Dr1 is consistent with the second direction vector Dr2. Consistency and opposition are opposite, and consistency means consistency in direction.

In step S13, the safety of an operation which may be performed on an operating arm is judged based on the safety judging basis direction vector, i.e., whether an operation which may be performed on an operating arm increases safety or increases risk is judged.

With the above technical solution, based on the parameters of each arm in the boom, it is realized to judge the safety of an operation which may be performed on the operating arm, and the operating arm has not been operated at the time of judging the safety, so the judgment of the safety of the operation which may be performed on the operating arm is pre judgment, that is, it is realized that the safety of the operation which is about to be performed on the operating arm is pre-judged, and the predictability is realized. In addition, the safety of the operation which may be performed on the operating arm can be predicted based on the judgment result, and the operator can perform the operation for increasing the safety on the operating arm based on the judgment result, thus avoiding the problem that the operator may carry out the operation opposite to the operation of avoiding tilting because of misjudgment, which will eventually lead to accidents. The technical solution provided by the embodiment of the invention has a simple and direct judging basis and a small calculation force requirement and correctness can cover all postures of the chain boom. According to the boom posture and the center of mass, the technical solution has predictability, that is, the influence of the action on the engineering machinery (anti-) tilting has been foreseen before the action operation, and the judgment of the safety direction is both real-time and advanced. In addition, the technical solution provided by the embodiment of the invention does not limit the posture of the boom and has universality. The technical solution only relates to the safety judgment (pre judgment) of the operation (for example, the unfolding and folding action) of the chain boom, and does not include the safety judgment of the rotating action of a turntable, so that it can also be applied to some chain-type folding arm devices that do not include the rotating action of the turntable. In addition, the technical solution is applicable to many engineering machinery, for example, it can be applied to a mobile engineering machinery adopting an independent computing control unit, and can also be applied to a mobile engineering machinery adopting multiple computing control units, such as adoption of the modes of equipment local detection information acquisition, remote computing safety judgment and equipment local execution control.

Preferably, in an embodiment of the invention, the judging the safety of an operation which may be performed on an operating arm based on the safety judging basis direction vector includes: judging that the operation of unfolding the operating arm increases safety and the operation of folding the operating arm increases risk under the condition that the direction of the first direction vector is consistent with the direction of the second direction vector and the direction of the third direction vector is vertically upward; judging that the operation of unfolding the operating arm increases risk and the operation of folding the operating arm increases safety under the condition that the direction of the first direction vector is consistent with the direction of the second direction vector and the direction of the third direction vector is not vertically downward; judging that the operation of unfolding the operating arm increases safety and the operation of folding the operating arm increases risk under the condition that the direction of the first direction vector is inconsistent with the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

By taking an example of operating a mobile machinery including an N-link chain folding arm with reference to FIG. 4, an exemplary description of judging the safety of an operation which may be performed on an operating arm based on the safety judging basis direction vector will now be made. It should be noted that the first action is the operation of unfolding the boom and the reverse action of the second action. When the boom is horizontally fully unfolded, the first action on the operating arm can generate a movement for making the terminal end of the operating arm upward. The second action is an operation of folding the boom and the reverse action of the first action. When the boom is horizontally fully unfolded, the second action on the operating arm can generate a movement for making the terminal end of the operating arm downward.

For the mobile machinery with an N-link chain folding arm, the driving action on any k-th arm ($0<k\leq N$) is dangerous if the center of gravity of the whole arm is far away from the bearing area of the mobile machinery because of the action, and the action direction of the arm caused by the driving is a dangerous direction, and the opposite direction is a safe direction. Here, the "bearing area" is an area where the mobile machine is supported by the ground. For example, the bearing area of the pump truck is the area determined by connection lines of support points of four support legs; the bearing area of an aerial work platform is the area defined by its bearing tires; and the bearing area of a construction robot is the support bearing area determined by the combination of support legs and tires. In this solution, the bearing area is a convex polygon. For the bearing area of convex polygon, the center of gravity of the boom of the mobile device is far away from its bearing area, which means that the center of gravity of the whole mobile device is far away from its bearing area. The structural design of mobile equipment also needs to meet the adaptation of the bearing area and the extension range (center of gravity range) of the boom, so the boundary of the bearing area is the safe boundary of anti-tilting of the mobile equipment, and the initial state must be safe, that is to say, the center of gravity of the whole machine integrated with the weight of the boom is located in the bearing area. Therefore, the distance of the center of gravity of the boom from the bearing area will make the center of gravity of the whole machine close to the edge of the bearing area and eventually exceed the bearing area, which will lead to the danger of tilting. Therefore, the action of each arm has a action direction that is a dangerous direction (and a safe direction). Accurate identification of the action safety of each arm is the basis of arm control to prevent tilting.

Figure 4:
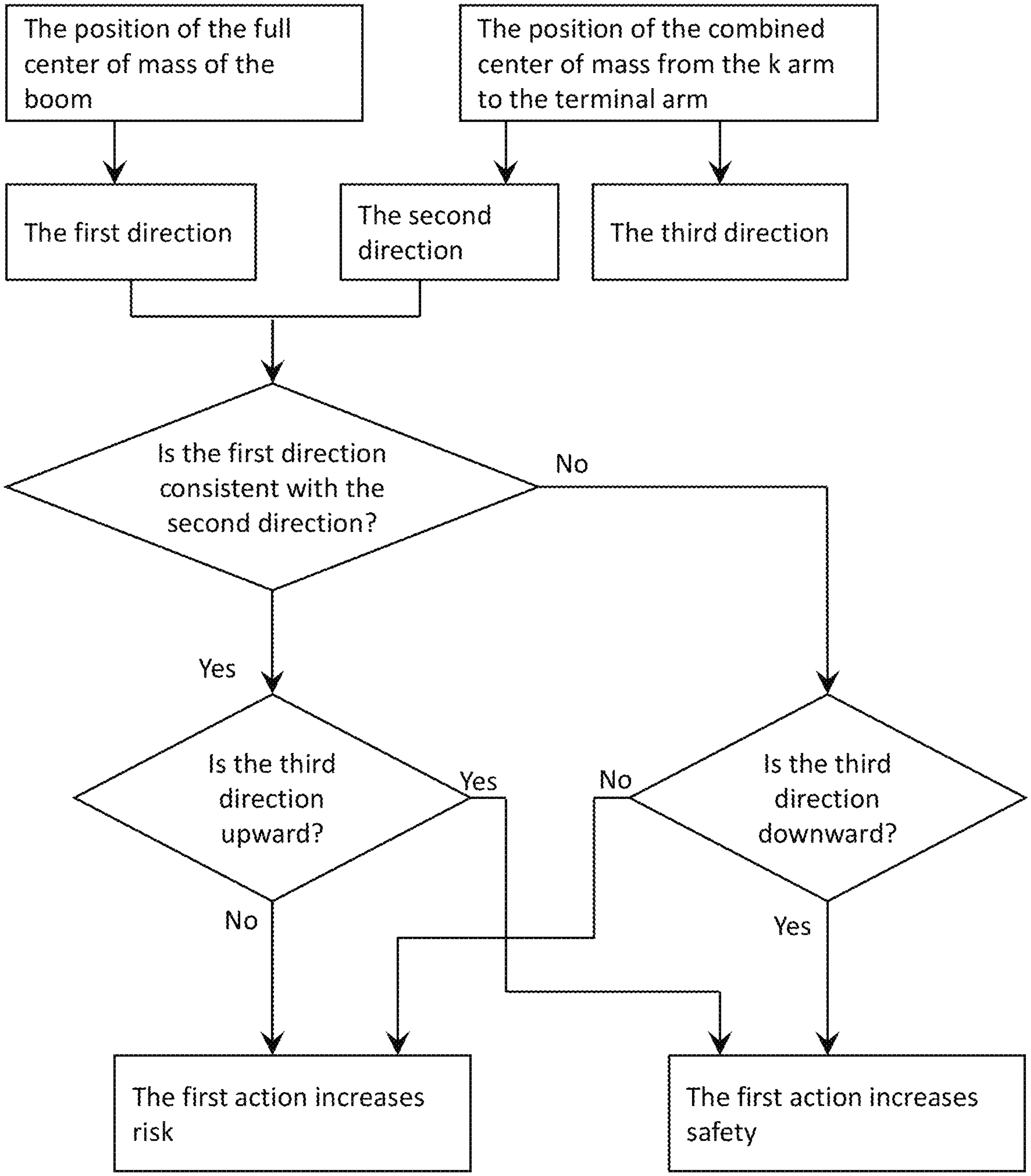
FIG. 4 is a logical schematic diagram illustrating a method for judging the safety of an operation which may be performed on a boom of engineering machinery provided by another embodiment of the invention.

As shown in FIG. 4, the position of the center of mass of the full boom and the position of the center of mass from the k arm to the terminal arm are determined, wherein the position of the center of mass of the full boom is the position of the full center of mass in the embodiment of the invention, the k arm represents the operable arm, that is, the operating arm in the embodiment of the invention, and the position of the center of mass from the k arm to the terminal arm is the position of the combined center of mass in the embodiment of the invention. The method of determining the position of the center of mass can refer to the method described in the above embodiments.

A first direction (first direction vector), a second direction (second direction vector), and a third direction (third direction vector) are determined, wherein the method of determining the direction vector can refer to the method described in the above embodiments.

Whether the first direction and the second direction are consistent is judged; whether the third direction is upward is judged under the condition of consistency; in case of inconsistency, whether the third direction is downward is judged.

If the third direction is upward under the condition that the first direction and the second direction are consistent, the first action increases safety and the second action increases risk; if the third direction is not upward under the condition that the first direction and the second direction are consistent, the first action increases risk and the second action increases safety.

If the third direction is downward when the first direction and the second direction are inconsistent, the first action increases safety and the second action increases risk; if the third direction is not downward when the first direction and the second direction are inconsistent, the first action increases risk and the second action increases safety.

Preferably, in the embodiment of the present invention, when specifically controlling the boom operation, whether or not it is necessary to limit the boom action may be judged first, and in the case where it is necessary to limit the boom action, the operation of the operation arm is controlled in accordance with the judgment result of an operation which may be performed on the operation arm. This section is described below by way of example with reference to FIG. 5. When there is a need to limit boom action (to secure the engineering machinery, e.g. mobile chain boom equipment, against tilting), boom operations where the center of gravity of the whole machine is drawn from the center of the bearing area towards its boundary (even past the boundary line to cause tilting) may be limited according to the control flow implementation of FIG. 5.

The arm postures and arm parameters (the parameters include the arm size, arm mass and arm distribution) are acquired, that is, the parameters of each arm in the boom are acquired as described in above the embodiment.

The global center of mass from each arm to the terminal arm are obtained, and the coordinates of the center of mass from the k arm to the terminal arm are obtained, k is 1~N; when k=N, the obtained coordinates of the center of mass corresponds to the coordinates of the center of mass of the terminal arm, and when k=1, the obtained coordinates of the center of mass corresponds to the coordinates of the center of mass of the whole boom.

The position of the center of mass of the full boom and the position of the combined center of mass from the k arm to the terminal arm are determined, that is, the position of the full center of mass and the position of the combined center of mass are determined as described in the above embodiments.

The action safety of the k arm is judged, that is, the safety of an action which may be performed on the operating arm is judged, referring to the judging method described in the above-described embodiment in combination with FIG. 4. In this embodiment, the definitions of the first action and the second action for example are understood in conjunction with the introduction with respect to FIG. 4. It should be noted that the definitions of the first action and the second action are exemplary and are not intended to limit the present invention.

Whether it is necessary to limit the action of the boom is judged. For the condition judgment of "Whether it is necessary to limit the boom action?", the call of the above judgment can be realized by using various reasons and conditions. For example, in the pump truck, the trigger condition is that the stability safety factor of the whole vehicle judged based on the tilting torque is less than a certain threshold, and when the condition is met, the restriction on the boom action to the dangerous direction is activated; based on the relationship between the support area and the projection position of the center of gravity, when the center of gravity falls outside the limited area, the restriction on the boom action to the dangerous direction is activated; based on the angle relationship of the boom, when the angle combination exceeds the preset angle combination range, the restriction on the boom action to the dangerous direction is activated. It should be noted that, in the embodiment of the present invention, the judgment of whether the boom action is required to be restricted is not in particular order with the judgment of the safety of the operation that can be performed on the operating arm, but when the boom operation is controlled, it is necessary to first know the judgment result of whether the boom action is required to be restricted, and then operate the boom according to the judgment result.

Figure 5:
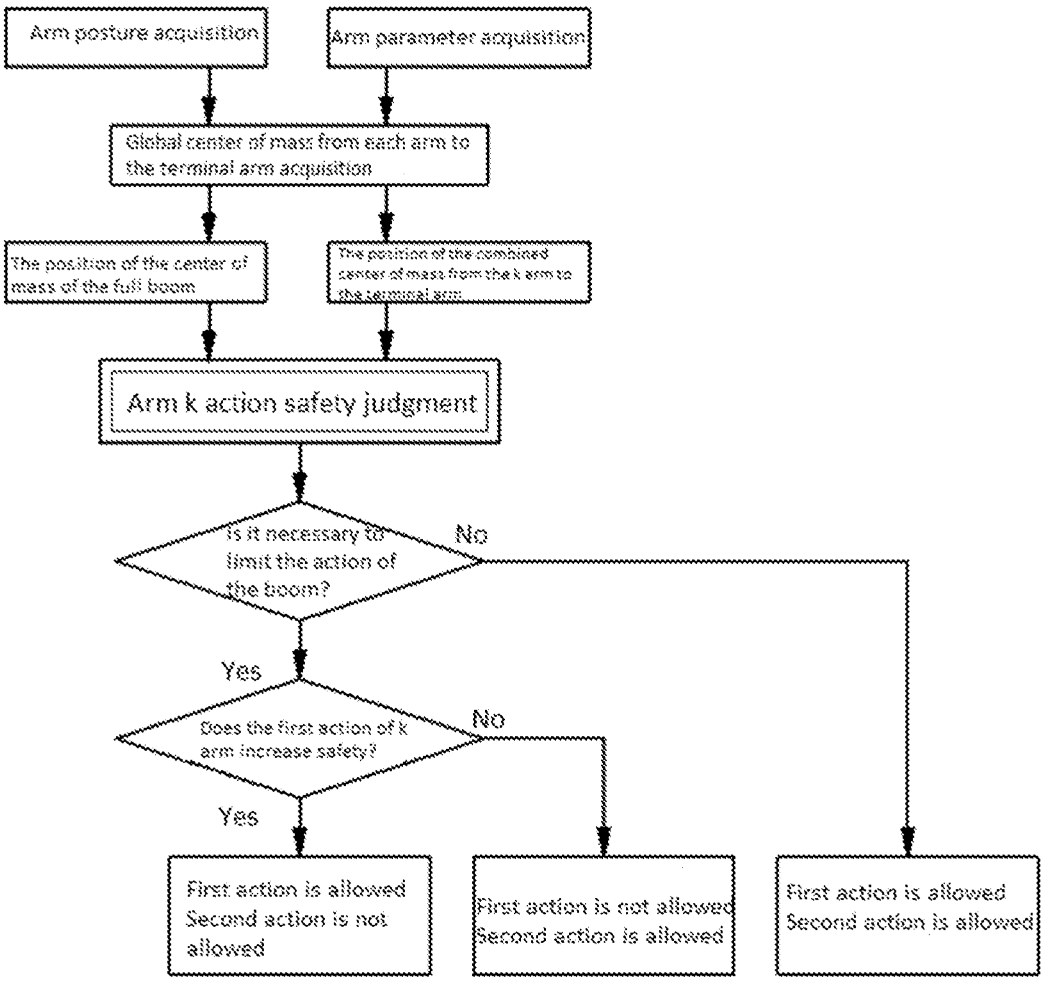
FIG. 5 is a logical schematic diagram illustrating a method for judging the safety of an operation which may be performed on a boom of engineering machinery provided by another embodiment of the invention.

In the case that the boom action needs to be restricted, what operations can be performed on the k arm is determined according to the judgment result of the action safety of the k arm. As shown in FIG. 5, if the first action of the k arm increases safety, the first action is allowed but the second action is not allowed; if the first action of the k arm increases risk, the second action is allowed but the first action is not allowed. In the case that there is no need to restrict the boom action, both the first action and the second action are allowed.

The safety of boom operation is pre judged in real time, and its control real-time response does not need to temporarily calculate the motion safety after the demand of "limiting boom action" is activated, which greatly saves the judgment delay caused by the operation time of the system, makes the system have high response timeliness, and enhances the safety control effect and the safety of equipment anti-tilting.

Preferably, in the embodiment of the present invention, before judging the safety of an operation which may be performed on the operating arm, the method further includes: judging whether any operation which may be performed on any arm of the operating arm is safe and risk-free; and not judging the safety of an operation which may be performed on the operating arm and allowing an unfolding or folding operation on the operating arm in the case that any operation which may be performed on any arm of the operating arm is safe and risk-free. There are many solutions to judge whether any operation which may be performed on any arm of the operating arm is safe and risk-free, for example, according to the support area and a new area formed by a certain margin far away from its boundary, if the center of gravity of the whole vehicle falls in this area, it is considered safe and risk-free when one or more arms of the boom are moved arbitrarily. Thus, it is realized that there is no need to judge the safety of the operation that can be performed on the operating arm under any circumstances, so that the operation is saved and the working efficiency is improved.

Figure 6:
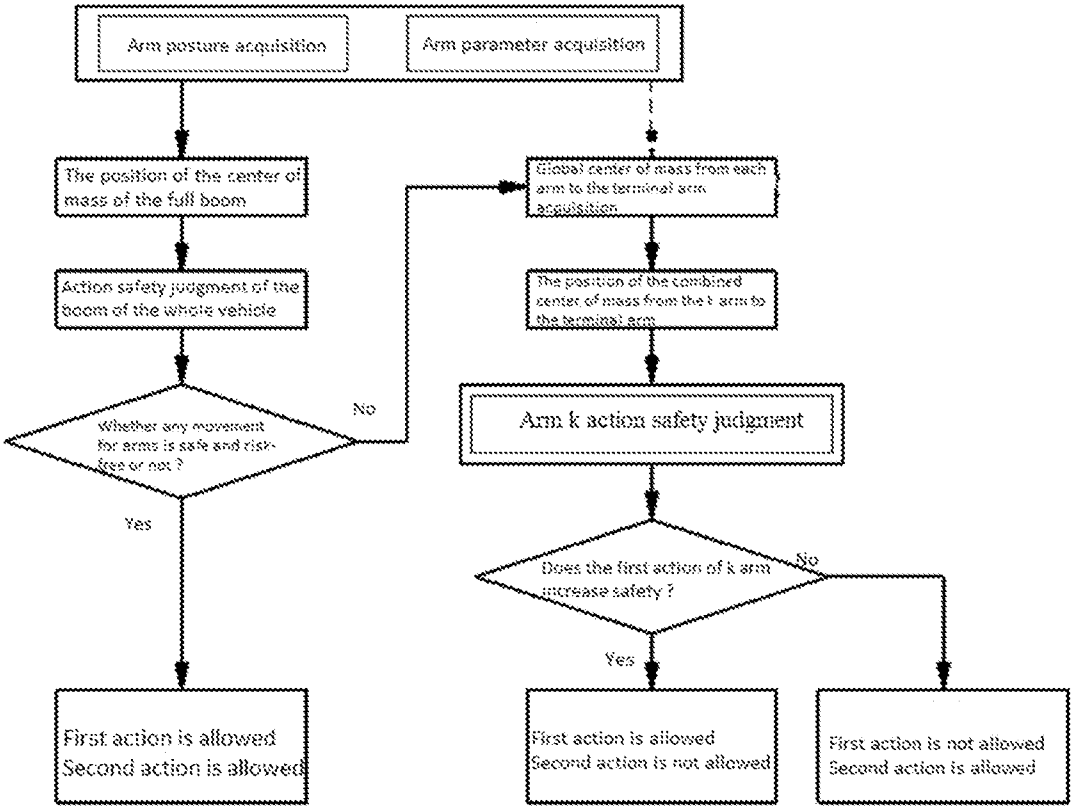
FIG. 6 is a logical schematic diagram illustrating a method for judging the safety of an operation which may be performed on a boom of engineering machinery provided by another embodiment of the invention.

FIG. 6 is a logic schematic diagram of a method for judging safety of an operation which may be performed on a boom of engineering machinery provided by another embodiment of the invention. FIG. 6 differs from the method shown in FIG. 5 in that in FIG. 6 full boom action safety judgment is added. The operation of the k arm allows the first action and the second action if the result of the full boom action safety judgment is that any movement for arms is safe and risk-free; and not that any movement for arms is safe and risk-free, it goes back to the method shown in FIG. 5.

The thinking of judging the action safety of the whole vehicle boom can be as follows: according to the supporting area and a new area formed by a certain margin far away from its boundary, if the center of gravity of the whole vehicle falls in this area, it is considered that it is safe and risk-free to move one or more arms of the boom at will, wherein the manner described herein does not include measuring only the leg reaction force and judging safety only from the leg reaction force relationship.

In the method shown in FIG. 6, the safety judgment is divided into two modules, and the judgment part on the right side of FIG. 6 does not need to be carried out under any operation, thus saving system operation. In order to save the computing power resources of the control system, "Arm k Action Safety Judgment" will be decomposed into more than one judgment function module. When it is judged that it is safe for the operation of the engineering machinery in the previous judgment, the calculation of the subsequent judgment module (the judgment part on the right side of FIG. 6) can be avoided, thus saving computing power. The solution shown in FIG. 6 can be used as a technical improvement solution of the pumping equipment adopting the prior art, that is, the judgment part shown on the right side of FIG. 6 is added to the original control program structure to realize the judgment and control of the action safety of a single arm.

Preferably, in an embodiment of the invention, the method further includes presenting the safety of an operation which may be performed on the operating arm in at least one of the following ways: a display screen interface, an indicator light, sound, a symbol and vibration. By displaying the safety judgment result, the operator (user) can be given clearer guidance information, so that he can "see is believe", and know what restriction control is carried out by the control system in the background, thus he can understand the state of the control system easily and avoid ineffective operation.

The manner of showing the safety of the operation which may be performed by an operating arm is described below in conjunction with FIGS. 7 and 8.

Figure 7:
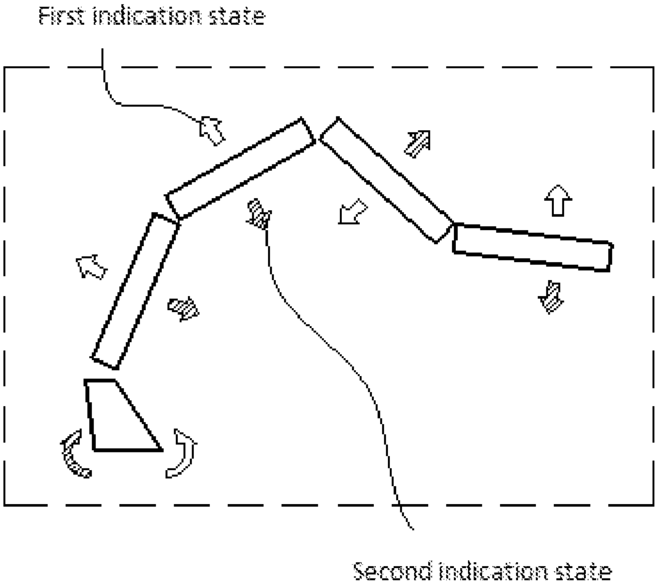
FIG. 7 is a schematic diagram illustrating operational safety provided by another embodiment of the present invention.
Figure 8:
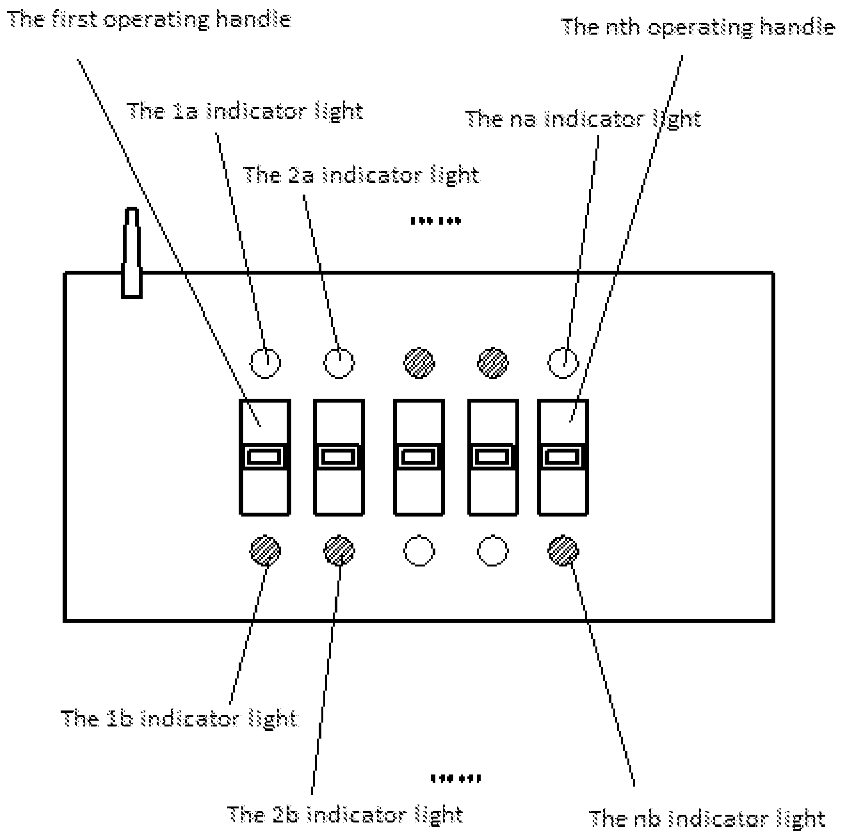
FIG. 8 is a schematic diagram illustrating operational safety provided by another embodiment of the present invention.

As shown in FIG. 7, the dashed box represents the visual human-computer interface window environment, the first indication state is used to indicate the first state of the arm operation executability (the operation will be responded to), and the second indication state is used to indicate the second state of the arm operation executability (the operation will not be responded to). The first indication state and the second indication state should be different, and should be presented with high contrast colors or states of flashing and non-flashing. An example is to indicate the safety of the operation which may be performed on the operating arm with an indicator light, and the tendencies towards safety and danger can be indicated by indicator lights of different colors. For example, a red indicator light indicates that the boom operation corresponding to the indication symbol is unexecutable or tends to be dangerous, and a green indicator light indicates that the boom operation corresponding to the indication symbol is executable or tends to be safe. In addition, the indication symbol may take a variety of forms, for example, it may also be marked by a symbol or text of "lock"-"unlock", "forbidden"-"allow".

In fact, the human-computer interaction function (i.e., presenting the safety of the operation which may be performed on the operating arm) can be a stand-alone function, even if the control system does not make any restriction intervention to the boom movement, the human-computer interaction system can still independently form a reminder and guidance to the operator, avoid the dangerous operation, and then ensure the operation (posture) safety of the boom of the engineering machinery (for example, the mobile machinery).

Taking the mobile mechanical boom as an example, the "display" mode of human-computer interaction can be realized on the device monitor, display screen, remote controller display screen, or other display terminals (such as mobile phones with terminal APP), and can also be presented in the form of indicator lights on the remote controller. As shown in FIG. 8, the 1a indicator light corresponds to the executability of the first operating handle in the direction a, and the 1b indicator light corresponds to the executability of the first operating handle in the direction b; other handles and indicator lights are arranged in the same way. Indicator lights indicate the executability of a certain direction through different states. For example, an example is that all indicator lights are red, and when the indicator lights are on, it indicates that the operation cannot (is not allowed) to be performed or increases risk; when the indicator lights are off, it indicates that the operation is unlimited, which can be executed or increase safety. For example, another example is that all indicator lights are green, and when the indicator lights are on, it indicates that the handle operation in this direction can (allow) be performed or increase safety; when the indicator lights are off, it indicates that the operation is restricted, so as not to perform or increase risk. In addition, the technical solution provided by the embodiment of the invention does not exclude the superposition use of other human-computer interaction means, such as sound alarm, vibration reminder and the like.

Display is not the only man-machine interaction way of the technical solution provided by the embodiment of the invention, and the sound alarm mode is preferably supplemented to strengthen the reminder to the operator. The alarm function occurs when a restriction is taken or when it is judged that the restriction needs to be taken by a person (boom operation).

Further the control system portion corresponding to the technical solution provided by the embodiment of the present invention can be understood with reference to the following exemplary introduction.

The system structure includes: the boom posture detection unit is connected with the calculation control unit; the boom action control unit is connected with the calculation control unit; the calculation control unit is connected with the boom action execution unit. The boom posture detection unit is configured to detect the posture of each boom, and the realization modes include boom angle detection (inclination angle sensor or included angle potentiometer or rotary encoder, etc.) or boom cylinder stroke detection sensor (linear encoder or pull wire sensor or laser distance sensor, etc.); the boom action control unit is used for the operator to send the control instruction of the boom action to the mobile device, and the realization mode is remote controller or program-controlled intelligent control device (pre-programmed, triggered by the operator); the calculation control unit receives data and signals from the boom posture detection unit and the boom action control unit, and carry out calculation processing: after the boom posture data from the boom posture detection unit is output to the calculation control unit, the safety of the boom action direction can be judged according to the boom structure and an electro-hydraulic system, the judgment result of the boom posture detection unit and the calculation control unit is used to interfere an output of the calculation control unit to the boom action execution unit, i.e., to interfere the execution of the boom action, when the boom action instruction from the boom action control unit is received.

Therefore, if it is only a simple judgment method, the system only needs the boom posture detection unit and the calculation control unit. In order to maintain the integrity of the control, the actual system consists of the boom posture detection unit, the boom action control unit, the calculation control unit and the boom action execution unit. If the calculation and control of safety judgment are not realized by the same device, the calculation control unit is divided into a calculation judgment unit and a control unit, the calculation judgment unit and the control unit are connected through communication, and the calculation judgment unit outputs the judgment result of the safety direction of the boom action to the control unit. At this time, the system structure is as follows: the boom posture detection unit and the boom action control unit are connected in parallel with the calculation judgment unit, the calculation judgment unit is connected with the control unit, and the control unit is connected with the boom action execution unit.

Accordingly, another aspect of the embodiment of the present invention provides an apparatus for determining the safety of an operation which may be performed on a boom of an engineering machinery.

Figure 9:
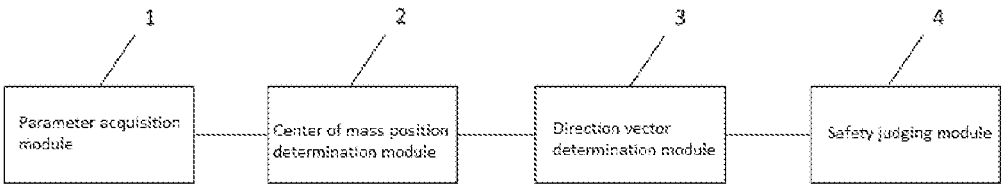
FIG. 9 is a structural schematic diagram illustrating an apparatus for judging the safety of an operation which may be performed on a boom of engineering machinery provided by another embodiment of the invention.

FIG. 9 is a structural schematic diagram illustrating an apparatus for judging the safety of an operation which may be performed on a boom of engineering machinery provided by another embodiment of the present invention. As shown in FIG. 9, the apparatus includes a parameter acquisition module 1, a center of mass position determination module 2, a direction vector determination module 3, and a safety judging module 4. the parameter acquisition module 1 is configured to acquire the parameters of each arm in the boom, wherein, the parameters include inclination angle, arm length and mass; the center of mass position determination module 2 is configured to determine, based on the acquired parameters, a position of the full center of mass of the boom and a position of the combined center of mass from an operating arm to a terminal arm; the direction vector determination module 3 is configured to determine a safety judging basis direction vector based on the position of the full center of mass and the position of the combined center of mass; the safety judgment module 4 is configured to judge the safety of an operation which may be performed on an operating arm based on the safety judging basis direction vector.

Preferably, in an embodiment of the invention, the safety judging basis direction vector includes a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass.

Preferably, in an embodiment of the invention, the safety judging module judges the safety of an operation which may be performed on an operating arm based on the safety judging basis direction vector includes: judging that the operation of unfolding the operating arm increases safety and the operation of folding the operating arm increases risk under the condition that the direction of the first direction vector is consistent with the direction of the second direction vector and the direction of the third direction vector is vertically upward; judging that the operation of unfolding the operating arm increases risk and the operation of folding the operating arm increases safety under the condition that the direction of the first direction vector is consistent with the direction of the second direction vector and the direction of the third direction vector is not vertically upward; judging that the operation of unfolding the operating arm increases safety and the operation of folding the operating arm increases risk under the condition that the direction of the first direction vector is inconsistent with the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

Preferably, in an embodiment of the invention, before judging the safety of an operation which may be performed on the operating arm, the safety judging module is further configured to: judging whether any operation which may be performed on any arm of the boom is safe and risk-free; and not judging the safety of any operation which may be performed on the operating arm and allowing an unfolding or folding operation on the operating arm in the case that an operation which may be performed on any arm of the boom is safe and risk-free.

Preferably, in an embodiment of the invention, the apparatus further including a presentation module configured to present the safety of an operation which may be performed on the operating arm in at least one of the following ways: a display screen interface, an indicator light, sound, a symbol and vibration.

Specific operating principles and benefits of the apparatus provided by the embodiment of the present invention for judging the safety of an operation which may be performed on a boom of an engineering machinery are similar to the specific operating principles and benefits of the method provided by the embodiment of the present invention for judging the safety of an operation which may be performed on a boom of an engineering machinery, and will not be described here.

In addition, another aspect of the embodiment of the present invention also provides engineering machinery including the device described in the above embodiment.

In addition, another aspect of the embodiment of the present invention also provides a machine-readable storage medium which stores instructions for causing a machine to perform the method described in the above-described embodiment.

Preferred embodiments of the present invention have been described in detail above with reference to the accompanying drawings, but the present invention is not limited to the specific details in the above embodiments. Within the scope of the technical conception of the present invention, a plurality of simple modifications can be made to the technical proposal of the present invention, and these simple modifications all belong to the protection scope of the present invention.

Further, it should be noted that the specific technical features described in the above specific embodiments can be combined in any suitable manner without contradiction. In order to avoid unnecessary repetition, various possible combinations of the present invention are not described separately.

Furthermore, any combination between the various embodiments of the invention may be made so long as it is not contrary to the idea of the invention and is likewise to be regarded as the disclosure of the invention.

The invention claimed is:

1. A method for judging safety of an operation which is performed on a boom of engineering machinery, comprising:

acquiring parameters for each arm in the boom, wherein the parameters comprise an inclination angle, an arm length, and mass;

determining, based on the acquired parameters, a position of the full center of mass of the boom and a position of the combined center of mass from an operating arm to a terminal arm;

determining a basis direction vector for safety judging based on the position of the full center of mass and the position of the combined center of mass; and judging the safety of an operation which is performed on the operating arm based on the basis direction vector, wherein the basis direction vector comprises a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass, wherein the judging the safety of the operation which is performed on the operating arm based on the basis direction vector comprises:

judging that the operation of unfolding the operating arm increases safety and the operation of folding the operating arm increases risk under the condition that the direction of the first direction vector is consistent with the direction of the second direction vector and the direction of the third direction vector is vertically upward;

judging that the operation of unfolding the operating arm increases risk and the operation of folding the operating arm increases safety under the condition that the direction of the first direction vector is consistent with the direction of the second direction vector and the direction of the third direction vector is not vertically upward;

judging that the operation of unfolding the operating arm increases safety and the operation of folding the operating arm increases risk under the condition that the direction of the first direction vector is inconsistent with the direction of the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

2. The method according to claim 1, before judging the safety of an operation which is performed on the operating arm, further comprising:

judging whether any operation which is performed on any arm of the boom is safe and risk-free; and not judging the safety of an operation which is performed on the operating arm and allowing an unfolding or folding operation on the operating arm in the case that any operation performed on any arm of the boom is safe and risk-free.

3. The method according to claim 1, further comprising:

presenting the safety of an operation which is performed on the operating arm in at least one of the following ways: a display screen interface, an indicator light, sound, a symbol and vibration.

4. A method for controlling a boom of engineering machinery, comprising:

judging safety of an operation which is performed on an operating arm in the boom according to the method for judging the safety of an operation which is performed on a boom of engineering machinery, wherein the method for judging the safety of an operation which is performed on a boom of engineering machinery comprising:

acquiring parameters for each arm in the boom, wherein the parameters comprise an inclination angle, an arm length, and mass;

determining, based on the acquired parameters, a position of the full center of mass of the boom and a position of the combined center of mass from an operating arm to a terminal arm;

determining a basis direction vector for safety judging based on the position of the full center of mass and the position of the combined center of mass; and judging the safety of an operation which is performed on the operating arm based on the basis direction vector;

judging whether it is necessary to limit the action of the boom; and limiting the action of the operating arm according to the judgment result of the safety of the operation which is performed on the operating arm under the condition that it is necessary to limit the action of the boom, wherein the basis direction vector comprises a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass, wherein the judging the safety of the operation which is performed on the operating arm based on the basis direction vector comprises:

judging that the operation of unfolding the operating arm increases safety and the operation of folding the operating arm increases risk under the condition that the direction of the first direction vector is consistent with the direction of the second direction vector and the direction of the third direction vector is vertically upward;

judging that the operation of unfolding the operating arm increases risk and the operation of folding the operating arm increases safety under the condition that the direction of the first direction vector is consistent with the direction of the second direction vector and the direction of the third direction vector is not vertically upward;

judging that the operation of unfolding the operating arm increases safety and the operation of folding the operating arm increases risk under the condition that the direction of the first direction vector is inconsistent with the direction of the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

5. The method according to claim 4, before judging the safety of an operation which is performed on the operating arm, the method for judging the safety of an operation which is performed on a boom of engineering machinery further comprising:

judging whether any operation which is performed on any arm of the boom is safe and risk-free; and not judging the safety of an operation which is performed on the operating arm and allowing an unfolding or folding operation on the operating arm in the case that any operation performed on any arm of the boom is safe and risk-free.

6. The method according to claim 4, the method for judging the safety of an operation which is performed on a boom of engineering machinery further comprising:

presenting the safety of an operation which is performed on the operating arm in at least one of the following ways: a display screen interface, an indicator light, sound, a symbol and vibration.

7. An apparatus for judging the safety of an operation which is performed on a boom of engineering machinery, comprising:

a parameter acquisition module configured to acquire parameters for each arm in the boom, wherein the parameters comprise an inclination angle, an arm length, and mass;

a center of mass position determination module configured to determine, based on the acquired parameters, a position of the full center of mass of the boom and a position of the combined center of mass from an operating arm to a terminal arm;

a direction vector determination module configured to determine a basis direction for safety judging vector based on the position of the full center of mass and the position of the combined center of mass; and a safety judging module configured to judge the safety of an operation which is performed on the operating arm based on the basis direction vector, wherein the safety judging basis direction vector comprises a first direction vector, a second direction vector, and a third direction vector, wherein the first direction vector is a projection vector in a horizontal plane of a direction vector from a beginning end of the boom to the position of the full center of mass, the second direction vector is a projection vector in the horizontal plane of a direction vector from a beginning end of the operating arm to the position of the combined center of mass, and the third direction vector is a projection vector in a vertical direction perpendicular to the horizontal plane of a direction vector from the beginning end of the operating arm to the position of the combined center of mass, wherein the safety judging module judges the safety of the operation which is performed on the operating arm based on the basis direction vector comprising:

judging that the operation of unfolding the operating arm increases safety and the operation of folding the operating arm increases risk under the condition that the direction of the first direction vector is consistent with the direction of the second direction vector and the direction of the third direction vector is vertically upward;

judging that the operation of unfolding the operating arm increases risk and the operation of folding the operating arm increases safety under the condition that the direction of the first direction vector is consistent with the direction of the second direction vector and the direction of the third direction vector is not vertically upward;

judging that the operation of unfolding the operating arm increases safety and the operation of folding the operating arm increases risk under the condition that the direction of the first direction vector is inconsistent with the direction of the second direction vector and the direction of the third direction vector is vertically downward; and judging that the operation of unfolding the operating arm increases risk and the operation of folding the operating arm increases safety under the condition that the direction of the first direction vector is inconsistent with the direction of the second direction vector and the direction of the third direction vector is not vertically downward.

8. He apparatus according to claim 7, before judging the safety of an operation which may be performed on the operating arm, the safety judging module is further configured to:

judge whether any operation which is performed on any arm of the boom is safe and risk-free; and not judge the safety of an operation which may be performed on the operating arm and allow an unfolding or folding operation on the operating arm in the case that any operation which may be performed on any arm of the boom is safe and risk-free.

9. The apparatus according to claim 7, further comprising:

a presentation module configured to present the safety of an operation which may be performed on the operating arm in at least one of the following ways: a display screen interface, an indicator light, sound, a symbol and vibration.

* * * * *